US005696186A

United States Patent [19]

Videau

[11] Patent Number: 5,696,186
[45] Date of Patent: Dec. 9, 1997

[54] PROCESS FOR IMPROVING THE MUTUAL COMPATIBILITY OF POLYMERS

[75] Inventor: Didier Videau, Lille, France

[73] Assignee: Roquette Freres, France

[21] Appl. No.: 618,842

[22] Filed: Mar. 20, 1996

[30] Foreign Application Priority Data

Mar. 21, 1995 [FR] France .................... 95 03274

[51] Int. Cl.$^6$ .................... C08L 5/16; C08L 3/02
[52] U.S. Cl. .................... 524/48; 106/205.01; 106/206.1; 524/47; 536/103
[58] Field of Search .................... 106/210; 524/35, 524/47, 48, 56; 536/103

[56] References Cited

U.S. PATENT DOCUMENTS

| 4,356,115 | 10/1982 | Shibanai et al. ............ 252/522 A |
| 5,234,978 | 8/1993 | Delrue et al. ............ 524/53 |

FOREIGN PATENT DOCUMENTS

| 0013688 | 8/1980 | European Pat. Off. . |
| 13688 | 8/1980 | European Pat. Off. . |
| 0327505 | 8/1989 | European Pat. Off. . |
| 0361087 | 4/1990 | European Pat. Off. . |
| 361087 | 9/1990 | European Pat. Off. . |
| 0458464 | 11/1991 | European Pat. Off. . |
| 458464 | 11/1991 | European Pat. Off. . |
| 0459560 | 12/1991 | European Pat. Off. . |
| 0542155 | 5/1993 | European Pat. Off. . |
| 542115 | 5/1993 | European Pat. Off. . |
| 0554939 | 8/1993 | European Pat. Off. . |
| 62-263047 | 11/1987 | Japan . |
| 63-212548 | 9/1988 | Japan . |

OTHER PUBLICATIONS

M. Xanthos, "Polymer Engineering and Science" mid–Nov. 1988, vol. 28, No.21, pp. 1392–1400.
Patent Abstracts of Japan vol. 15, No. 285 (C–851)[4813], Jul. 19, 1991 & JP-A-03 100065 (Toppan Printing Co Ltd) Apr. 25, 1991 Abstract.
A. Harada et al., "Proc. Japan Acad., 69, Ser. B (1993)" pp. 39–44.

Primary Examiner—Peter A. Szekely
Attorney, Agent, or Firm—Henderson & Sturm

[57] ABSTRACT

A process for improving the mutual compatibility of natural and/or synthetic polymers by the use of cyclodextrin in the polymer mixture, wherein the cyclodextrin represents in particular from about 0.5% to about 20% by weight of the polymer mixture, wherein the polymer mixture includes a starch, in particular a plasticized starch and a synthetic polymer selected in the group consisting of a polyethylene, a polypropylene, a polystyrene, a polyvinyl chloride, a polyvinyl alcohol, and a poly(ε-caprolactone), wherein the cyclodextrin is provided in the form of a composition containing one of the constituent polymers of the mixture (for example starch), a plasticizer (for example a polyol), a nucleation agent and/or a standard compatibilizing agent.

23 Claims, No Drawings

PROCESS FOR IMPROVING THE MUTUAL COMPATIBILITY OF POLYMERS

The present invention relates to a novel process for improving the mutual compatibility of polymers, it being possible for one of the said polymers especially to be of natural origin, in particular a starch.

The invention is also directed towards thermoformed, possibly welded articles obtained from mixtures of polymers resulting from the said process.

In the sense of the present invention, the notion of "improvement of the mutual compatibility of two polymers" should, firstly, be understood to mean the improvement in the mechanical properties of the resulting polymer mixture. This improvement may be linked to an increase in the affinity (including that at the molecular level), or even in the miscibility itself, of the two polymers.

It is known that many industries have already been led to use various combinations between two, or more, so-called incompatible or poorly compatible polymers, which have in particular, on account of their respective physicochemical characteristics (polarity, melting point, molecular size, etc.), an affinity or miscibility which is limited, or even nonexistent, or which may only be expressed under very specific preparation and/or implementation conditions. Among these industries there may be mentioned, firstly, the plastics industries which, for technical reasons (manufacture of composite polymer materials in particular) or economic reasons, use or will make use of combinations of two, or even more, polymers of natural or synthetic origin, which have appreciable incompatibility and in particular very limited possibilities of mixing.

Other fields of application such as, for example, those concerning textiles, paper production, cardboard production, adhesives, detergents or plant protection products, use or would be liable to use industrially, in the context of processes such as surfacing, sizing, layering, bonding, laminating, coating, granulating or the like, mixtures based on incompatible or poorly compatible materials, and in particular based on at least one polymer which is quite (strongly) hydrophilic or polar, on the one hand, and on at least one polymer which is quite (strongly) hydrophobic or apolar, on the other hand.

The commercial value of such mixtures lies mainly in the production of an acceptable "performance/price" ratio which makes it possible to foresee the replacement of more standard polymers hit by obsolescence and/or the development of novel industrial applications.

However, the design, development or use of such polymer mixtures is often obstructed by the incompatibility, and in particular the lack of affinity, or even of miscibility, of their constituents.

The introduction of so-called "coupling agents", "adhesion promoters" or, more broadly, "compatibilizing agents" promotes the combination or miscibility of polymers which otherwise have little or no compatibility and, thus, the preparation of polymer mixtures having specific properties (strength, rigidity, theological behaviour, etc.), which can be improved relative to those obtained in the absence of such agents.

Examples which may be recalled are the commercial success of compatibilized multiphase systems such as "impact" polystyrene (HIPS=high impact polystyrene) or ABS (acrylonitrile-butadiene-styrene) copolymers.

In general, two main techniques are known to be suitable for improving the compatibility of polymers.

The first consists in adding, to two polymers which are poorly compatible or quite clearly incompatible, a third constituent capable of reacting with the polymer mixture by means of chemical reactions or specific interactions. Grafted or block copolymers, crosslinking agents and a large variety of low molecular weight molecules fall within this first category of compatibilizing agents. The choice of a grafted or block copolymer as compatibilizing agent is generally based on the miscibility or reactivity of its segments with at least one of the compounds of the mixture.

The second compatibilization technique consists in preparing and then mixing polymers which have been suitably functionalized beforehand and which are thus capable of bringing about the chemical reactions or interactions necessary to increase the mutual affinity thereof.

This functionalization may be performed, inter alia, in solution or in an extruder and may involve the formation, in situ, of grafted or block copolymers or halogenation, sulphonation, etc. reactions. These compatibilizing agents contain segments chemically identical to those of the polymers of the mixture and act in principle as interface agents.

Examples of compatibilizing agents which may be mentioned are those:

a) of reactive copolymer type: SAN/MA (poly)(styrene-co-acrylonitrile/maleic anhydride) copolymers, ABS/PA6 or PA6,6 (nylon 6 or nylon 6,6) mixtures, b) of unreactive copolymer type: PS/PE (polystyrene/polyethylene) grafted polymers, S-EB-S (styrene-ethylene/butadiene, styrene) copolymers, c) of low molecular weight compound type: crosslinking agents or grafting agents. Thus, the grafting of a chloroparaffin onto PP (polypropylene) makes it possible to compatibilize a PP-PVC (polyvinyl chloride) system.

For more details regarding the nature, the functions, the properties and the fields of application of compatibilizing agents, reference may be made to the article by M. Xanthos in "Polymer Engineering and Science" mid-November 1988, vol. 28 No. 21 pp. 1392–1400. Among the polymers used in the preparation of polymer mixtures for industrial purposes, in particular plastics, use is widely made of polymers of natural origin such as, for example, starches, polyglucans, polyfructans and polyxylans, gums (gum arabic, guar gum, xanthan gum, karaya gum, gum tragacanth, ghatti gum, carob gum etc.), dextrans, celluloses and hemicelluloses, lignin, pectins, animal and plant proteins, natural latexes, and natural polyesters, in particular poly(hydroxyalkanoates) of microbial origin. Natural polymers have the advantages, inter alia, of being inexpensive, renewable and biodegradable. Their main drawbacks are of imparting to finished articles which contain them reduced mechanical properties and/or significantly increased sensitivity to water.

It is thus generally necessary, in industrial practice, to combine at least one natural polymer with at least one synthetic polymer, the latter being chosen, in particular, from polyolefins, polystyrenes, vinylic polymers and copolymers, polyacetals, polyesters, polycarbonates, poly(alkylene teraphthalates), polyaryl ethers, polyimides, polyalkylene oxides and derivatives thereof.

Such synthetic polymers are described in particular in patent application EP 0,327,505, in particular from page 3 line 13 to page 3 line 31, this passage being incorporated in the present description.

It has, for example, often been recommended to combine starch with a synthetic polymer of hydrophobic nature, in particular a polyolefin, such that the resulting polymer mixture is of improved water resistance. However, the very polar nature of starch and apolar nature of the polyolefin (polyethylene) respectively are such that the polymer mixture obtained is very heterogeneous and unusable industrially.

For the purposes of increasing the affinity of these two polymers, it has been proposed, as described in patent EP 0,554,939, to use a so-called "alloy" composition containing, as compatibilizing agent (or "coupling agent"), at least one polyolefin modified with chemical functions which are active towards the hydroxyl (OH) functions of starch and which are provided by the use of maleic anhydride.

It is observed, however, that for a given starch, in this instance a standard corn starch, the choice of an effective compatibilizing agent remains very delicate. Thus, all conditions being otherwise equal, a given modified polyolefin, for example an ethylene/acrylic ester/maleic anhydride copolymer of Lotader® 3200 type, proves to be a good compatibilizing agent, whereas another modified polyolefin of similar chemical nature (Lotader® 3700) does not at all make it possible to solve the problems of heterogeneity and of resistance observed in the finished article obtained (film 1 mm in thickness).

U.S. Pat. No. 5,234,978 also describes the compatibilization of a specific synthetic polymer, in this instance a linear low density polyethylene (LLDPE), with a specific category of starches, in this instance alkylated or hydroxyalkylated starches, by the use of a compatibilizing agent selected specifically from ethylene/vinyl acetate, ethylene/acrylic acid and vinyl acetate/(meth)acrylic acid copolymers and ethylene/vinyl acetate/(meth)acrylic acid terpolymers.

Patent EP 542,115 describes the use of compatibilizing agents, including modified starches such as starch acetates or copolymers grafted with starch, for the purpose of improving, by physical interaction and/or chemical reaction, the adhesion of a first phase consisting specifically of cellulose ester and a second phase based on thermoplastic starch.

The overall result of the current state of the art is that:

1) compatibilizing agents are, in practice, usually used for the purpose of combining two specific polymers and that it is very difficult to transpose the use of a compatibilizing agent designed for a pair of polymers A/B to a pair of polymers C/D or even to a pair of polymers A/C or B/D.

2) the transposition of a compatibilizing agent from the application for which it was specifically designed (for example the compatibilization of two polymers in the molten phase) to other applications involving different implementation characteristics (for example a use of the polymer mixture in aqueous medium), is not straightforward industrially.

3) the use of starchy compounds as compatibilizing agents is, in industrial practice, very restricted since this involves their prior modification, such an operation often being intricate and/or expensive, in particular by grafting techniques.

4) the industrial use of starchy compounds as compatibilizing agents can only be limited by the problems of decreasing the mechanical properties and water sensitivity to which they give rise.

The result of the preceding text is thus that there is a real need to find an industrial means which makes it possible, simply and inexpensively, to improve the compatibility of a large variety of polymers and thereby even to improve the properties, in particular the mechanical properties of the articles obtained from the said polymers.

The Applicant has, to its credit, found that such a means could consist of the use of a cyclodextrin. More precisely, the subject of the present invention is a process for improving the mutual compatibility of polymers, characterized in that an effective amount of cyclodextrin is included in the mixture of the said polymers.

The expression "effective amount" refers to an amount of cyclodextrin which is sufficient to impart improved mechanical properties to the mixture of the said polymers.

Within the context of the invention, the term "cyclodextrin" refers to alpha, beta or gamma cyclodextrin, or mixtures thereof, as well as to derivatives of these cyclodextrins. It may be recalled that alpha, beta and gamma cyclodextrin are macrocycles containing six, seven and eight glucose units respectively. The term "derivative" should be understood to include any macrocycle as has just been defined, in which at least one of the constituent glucose units is substituted, in at least one place, with a group or a molecule which may be of very diverse size and functionality such as, for example, a hydrophobic group such as an alkenyl-succinyl group and in particular an octenyl-succinyl group, an alkyl or hydroxyalkyl group and in particular a hydroxypropyl group, an ionic group and in particular a cationic group, an amino or sulphate group, or a mono-, di- or trisaccharide molecule such as a molecule of glucose, fructose, maltose, sucrose or maltotriose. The term "derivative" also encompasses the cyclodextrin "polymers" obtained, for example, by reaction of cyclodextrins with polyfunctional reactants or fixed cyclodextrins, in particular grafted cyclodextrins, with supports of any nature (silica, zeolites, synthetic polymers, cellulose, starch, etc.).

In the context of the invention, use is preferably made of at least one cyclodextrin chosen from the group consisting of α-cyclodextrin, β-cyclodextrin and derivatives thereof, such as the alkenyl-succinyl, (hydroxy)alkyl or ionic derivatives thereof, and any mixtures of these products. As a guide, chemically unmodified β-cyclodextrin (referred to hereinbelow as BCD) is a particularly effective and inexpensive compatibilizing agent in the context of the invention.

The cyclodextrin may be used in the form of a solution whose concentration depends, inter alia, on the solubility of the said cyclodextrin in the chosen solvent (water, aliphatic alcohol, polyol or the like) and on the operating conditions used (temperature in particular).

The cyclodextrin may also be used in pasty form or in the form of a crystalline or amorphous powder obtained by any of the drying techniques known to those skilled in the art, including oven-drying, spraying or freeze-drying, it being possible for the said drying to be subsequent to a step of crystallization.

It should be recalled at this point in the description that the use of cyclodextrin in the plastics industry is well known, in particular for the purpose of introducing or protecting active principles of very diverse nature and function (fragrances, flavourings, pesticides, dyes, etc.) in the said plastics.

From this wealth of literature, mention may be made of Japanese patents Nos. 62-263047 and 63-212548, U.S. Pat. No. 4,356,115 and European patents EP 13,688, EP 458,464 and EP 361,087.

By way of example, Japanese patent No. 62-263047 describes composite packaging materials for food use containing a layer of polyolefin resin in which aromatic principles are encapsulated by a cyclodextrin.

European patent EP 458,464 describes the use of cyclodextrins in order to complex expansion agents. The complexes obtained make it possible, on fluidization of the plastic by a heat treatment, to release gases into the bulk and to obtain a so-called "cellular" structure of significantly reduced density.

European patent EP 361,087 moreover describes the introduction of a cyclodextrin into a polyolefin composition so as to encapsulate unwanted odoriferous molecules (benzaldehyde in particular) derived from the decomposition of a nucleation agent of alditol acetal type and in particular of the dibenzylidene-sorbitol (DBS) type.

The production of inclusion complexes between cyclodextrins and certain polymers has also been studied, in particular through the work of A. Harada et al. published in "Proc. Japan Acad., 69, 3, Ser. B (1993), pp. 39–44:".

This document describes the preparation and characterization of complexes between, respectively, polyethylene glycol (PEG) and α-cyclodextrin, polypropylene glycol (PPG) and β-cyclodextrin, and a poly (methyl vinyl ether) (PMeVE) and γ-cyclodextrin. The cyclodextrins in that case are studied purely as "host compound" for artificial systems for the molecular recognition of polymers.

In no way is it described or envisaged to incorporate the complexes formed into any polymer phase which would be incompatible with PEG, PPG or PMeVE.

In general, the literature never describes or envisages the possibility of improving the mutual compatibility of polymers by the use of a cyclodextrin and in particular of improving, as will be described elsewhere, the mechanical properties of a polymer mixture by such a use.

Within the context of the present invention, the notion of "polymer" is in no way limiting and includes in particular, without this list being limiting in the least:

1) Polymers of natural origin chosen from starches and other glucose polymers or polyglucans such as those commonly referred to as "polydextroses", fructose polymers or polyfructans such as, for example, inulin, xylose polymers or polyxylans, dextrans, natural gums such as xanthan gum, guar gum, gum arabic, etc., alginates, carrageenans, celluloses and hemicelluloses, lignin, pectins, animal or plant proteins such as gelatin or wheat or corn glutens, natural latexes, natural resins such as colophony, and natural polyesters such as the homopolymers or copolymers of lactic acid, glycolic acid, hydroxybutyric acid, hydroxypropionic acid or hydroxyvaleric acid or salts thereof.

2) Synthetic polymers chosen from polyolefins (such as polypropylenes and polyethylenes), polystyrenes, vinylic polymers and copolymers (such as polyvinyl chlorides (PVCs) and polyvinyl alcohols (PVOHs)), synthetic polyesters (such as lactone homo- or copolymers, for instance poly(ε-caprolactone) (PCL) or poly(α-valerolactone)), polyamides, ethylene/vinyl acetate copolymers and derivatives thereof, and ethylene/acrylic acid copolymers and derivatives thereof.

Within the context of the invention, it is understood that the notion of "polymer of natural origin" comprises the polymer materials of plant, microbial or animal origin which have been mentioned above, as well as these same materials which:

either, subsequent to their isolation from the natural medium from which they are derived, undergo at least one step of purification, dilution, concentration and/or physical, chemical (including enzymatic) and/or genetic modification, or are derived from genetically modified living materials (plants, microorganisms or animals).

Within the context of the invention, use will be made in particular, as "polymers of natural origin", of starches, polyfructans, celluloses and hemicelluloses, plant proteins, polymers and copolymers of lactic acid, glycolic acid, hydroxybutyric acid, hydroxypropionic acid and hydroxyvaleric acid, and most preferably of starches.

In the sense of the present invention, the term "starch" refers to any type of starch, irrespective of its origin, which is native or chemically, physically and/or genetically modified. When use is made of a native starch in order to constitute compositions in accordance with the invention, this starch is chosen in particular from the group comprising the native, natural or hybrid starches originating from corn with a high amylopectin content (waxy starch), from corn with a high amylose content, from wheat, rice, peas, potato or cassava, cuts or fractions which may be made thereof or obtained therefrom such as amylose, amylopectin, and the particle size cuts known to those skilled in the art under the names wheat starch "A" and wheat starch "B", and any mixtures of at least any two of the abovementioned products.

When use is made of a chemically modified starch as polymer in the context of the process in accordance with the invention, this starch is chosen in particular from the group comprising starches modified with at least one or other of the known techniques of plasticization, etherification, esterification, crosslinking, oxidation, alkaline treatment, acidic hydrolysis and/or enzymatic hydrolysis.

It is advantageously possible, for example, to make use of starches plasticized with at least one plasticizer, chosen from the group comprising, besides water, a) hydroxycarboxylic acid salts, in particular lactates and gluconates and products containing them, b) polyols, in particular sorbitol, mannitol, maltitol, maltotriitol, xylitol, lactitol, erythritol or glycerol, and mixtures of at least two polyols such as sorbitol/maltitol, sorbitol/mannitol, sorbitol/xylitol, sorbitol/glycerol, sorbitol/mannitol or sorbitol/maltitol/glycerol mixtures, hydrogenated starch hydrolysates such as those marketed by the Applicant under the names "Polysorb®", "Maltisorb®", "Neosorb®" and in particular the products referenced as Polysorb® 70/12/12, 75/10/15, 75/05/55 and 75/08/55 or the product Maltisorb® 75/75, c) urea and derivatives thereof such as thiourea, urea calcium bromide, urea hydrochloride, urea nitrate or urea oxalate.

It is also possible, for example, to make use of starches etherified with ionic groups, in particular cationic or non-ionic groups, it being possible for the latter to consist of hydroxyalkyl starches such as hydroxypropyl or hydroxyethyl starches. Starches esterified with hydrophobic groups, in particular alkenylsuccinyl and especially n-octenylsuccinyl groups, may also be used.

Within the context of the invention, it is also possible to use starches which have been physically modified beforehand, for example by treatment with microwaves or ultrasound, by extrusion-curing, by treatment on a drum or by compacting, it being possible for the said starches to be in a state of total destructuring, of partial destructuring or of simple gelatinization or pregelatinization.

In addition, the chemically modified starches such as those described above may, simultaneously, prior to or subsequent to the process of chemical modification, have been subjected to such a treatment of physical modification.

According to a first variant of the process according to the invention, the amount of cyclodextrin, for example of β-cyclodextrin or of one of the derivatives thereof, which is incorporated into the mixture of the said polymers is such that it represents from about 0.5 to about 20%, preferably from 1 to 10%, by weight of the resulting polymer mixture.

According to a second variant, the process according to the invention is characterized in that at least one of the said polymers is of natural origin and is chosen from the group comprising starches, polyfructans, celluloses and hemicelluloses, plant proteins, polymers and copolymers of lactic acid, glycolic acid, hydroxybutyric acid, hydroxypropionic acid or hydroxyvaleric acid, and any mixtures of these products.

Use is preferably made, as natural polymer, of at least one starch, it being possible for the latter to have been modified beforehand physically and/or chemically including by plasticization using, for example, at least one of the agents of the "hydroxycarboxylic acid salt" or "polyol" type described above.

According to another variant, the process according to the invention is characterized in that at least one of the said polymers is of synthetic origin and may in particular be chosen from polyolefins, polystyrenes, vinylic polymers and copolymers, and synthetic polyesters.

In addition, the Applicant has found that cyclodextrins were particularly suitable for compatibilizing, and in particular for improving the mechanical strength properties, of polymer mixtures based, on the one hand, on at least one starch, in particular a plasticized starch, and, on the other hand, on at least one synthetic polymer chosen from polyolefins, in particular polyethylenes and polypropylenes, polystyrenes, vinylic polymers and copolymers, as well as synthetic polyesters, in particular poly(ε-caprolactone) (PCL). Such polymer mixtures thus compatibilized are most particularly advantageous within the field of plastics.

The process according to the invention is preferably characterized in that:

one of the said polymers is a starch, another of the said polymers is a polymer of synthetic origin, and the weight ratio between starch and synthetic polymer in the mixture is between about 1/20 and about 20/1, preferably between 1/10 and 10/1.

The Applicant has, inter alia, observed that the process according to the invention was particularly applicable to polymer mixtures having a weight ratio between starch and synthetic polymer of approximately between 1/5 and 5/1.

Within the context of the invention, the polymer mixture whose mutual compatibility is improved by the introduction of a cyclodextrin may contain one or more adjuvants.

In the sense of the present invention, the term "adjuvants" refers in particular, without this list being limiting, to:

one or more plasticizers such as those described above, in particular one or more polyols and mixtures thereof, including the preconstituted mixtures thereof of "hydrogenated starch hydrolysate" type, one or more inorganic fillers such as, for example, titanium oxide, silicon oxide or aluminium oxide, talc, calcium carbonate and mixtures thereof, one or more water repellents such as those of organosilicon nature and, for example, alkali metal or alkaline-earth metal siliconates, silicone oils and mixtures thereof, one or more nucleation/clarification agents of synthetic polymers (in particular of the polyolefin type, such as polypropylenes and polyethylenes), for example alditol acetals of dibenzylidene-sorbitol (DBS) type and derivatives thereof.

Such derivatives result in particular from the dehydrocondensation of an alditol (for example sorbitol) with two molecules of benzaldehyde at least one of which is substituted, in at least one position, with any group or molecule, preferably an alkyl group (methyl, ethyl or the like) or halogen (fluorine, chlorine or the like).

The said substitution may in particular take place in the so-called "ortho", "meta" and/or "para" position on the benzene ring. Such nucleation agents are known, inter alia, under the names "Disorbene®", "Millad®", "Gel-All" or "NC-4";

one or more colorants, fireproofing agents, lubricants, antioxidants, fungicides or bactericides;

one or more compatibilizing agents used conventionally in the prior art, for example the "coupling" agents described in the abovementioned patent EP 554,969.

The water content of the polymer mixture obtained by the process according to the invention is not a predominant parameter in view of its subsequent use, in particular for the production of thermoformed, and then optionally welded, articles.

Provision will be made by simple means for the said mixture to have a moisture content such that its supply to subsequent mixing or transformation devices (extruders, blenders or injection presses) can be suitably ensured. In practice, this moisture content is equal to not more than about 40% and is in particular between about 0.5 and about 30%.

It should be pointed out, in the context of the process according to the invention, that the use and the placing together of the polymers, of the cyclodextrin and of possible adjuvants, including any plasticizer, in the polymer mixture may be carried out according to a multitude of variants, in particular as regards the form of introduction (liquid, viscous or solid form such as a powder or granules, introduction by intimate mixing or by spraying, etc.) and the moment of introduction (introduction from the start or broken up over time) of each of these constituents within the said mixture.

According to a preferred variant of the process, the cyclodextrin is provided in the polymer mixture in the form of a composition of compatibilizing function containing, besides the said cyclodextrin, at least one constituent chosen from the polymers constituting the said mixture, plasticizers (in particular polyols and mixtures thereof), nucleation agents corresponding to alditol acetals and compatibilizing agents corresponding to ethylenic copolymers.

According to an advantageous variant, the said composition contains at least one cyclodextrin, in particular BCD or one of the derivatives thereof and at least one plasticizer and/or a starch.

The latter may, as already pointed out, have undergone a prior chemical and/or physical modification of any nature, and may in particular consist of a plasticized starch.

When the said composition contains, besides a cyclodextrin, at least one starch as constituent polymer of the mixture, the weight ratio between cyclodextrin and starch is generally between about 1/1 and about 1/100, preferably between 1/2 and 1/50, and even more preferably between 1/5 and 1/50.

When this composition moreover contains, besides a cyclodextrin, at least one plasticizer, in particular a polyol, the weight ratio between cyclodextrin and plasticizer is generally between about 2/1 and about 1/50, preferably between 2/1 and 1/10, and even more preferably between 1/1 and 1/10.

Other compositions may be envisaged in the context of the invention, such as those combining a cyclodextrin and possibly a plasticizer with at least:

a starch and a nucleation agent such as DBS or any of the derivatives thereof, in particular the ethyl, methyl or halo derivatives thereof, a starch and a synthetic polymer such as a polyethylene, polystyrene, PVOH, PVC or PCL, a starch or a synthetic polymer and a standard compatibilizing agent such as those described in the abovementioned patent EP 554,939.

The water content of these compositions is not a predominant parameter as regards its application to the subsequent preparation of a compatibilized polymer mixture.

Provision will be made by simple means for a composition to have a moisture content such that its supply to subsequent mixing or conversion devices may be suitably ensured. In practice, this moisture content is equal to not more than about 40% and is in particular between about 0.5 and about 30%.

This composition may, after the placing together of all or some of the constituents thereof, undergo a treatment which is able, inter alia, to improve the homogeneity thereof. This treatment may be carried out on conventional devices of any type, in particular those used conventionally for the continuous or batchwise conversion of plastics and elastomers and in particular devices of the single-screw or twin-screw extruder type, blender type or injection press type.

Examples which may be mentioned are devices of modular constitution such as the MDK/E 46 or MDK/E 70 type co-blenders marketed by the company Buss.

A conical twin-screw extruder of Rheomex TW 100 type or a Brabender® plastograph blender may also be used.

After conversion, for example by extrusion or injection, the composition may advantageously be granulated by granulation devices of any type. After the placing together of all or some of the constituents thereof, the composition may also undergo a spray treatment.

Following this, the said composition is advantageously in the form of granules or a powder.

The presence or introduction of such a cyclodextrin-based composition, for example in granular form, into a polymer mixture poses no particular technical problem.

On the contrary, and as has already been pointed out, the use of a cyclodextrin allows, on account of its compatibilization effect, the generally easier preparation of a polymer mixture, this mixture having significantly improved mechanical properties.

Furthermore, it is noteworthy to observe that the advantages thus demonstrated by the Applicant may be obtained with low levels of introduction of cyclodextrin into polymer mixtures, including levels of the order of about 0.5 to about 5% by weight, expressed relative to the total weight of the polymer mixture.

Moreover, these advantages, in particular in terms of improvement of the mechanical properties, are all the more surprising since cyclodextrins turn out to be, as will be described elsewhere, compatibilizing agents applicable to a very wide range of polymer mixtures.

As regards more particularly mixtures of polymers at least one of which is a starch, the Applicant has moreover found that compositions combining a cyclodextrin with the said starch and with a plasticizer were particularly able to improve the mechanical properties of the said mixtures, provided that the said compositions had:

a cyclodextrin/starch weight ratio of between about 1/5 and about 1/50, and a cyclodextrin/plasticizer weight ratio of between about 1/1 and about 1/10.

Such compositions, which constitute novel products, may advantageously be in the form of granules or powder.

Following this and irrespective of the implementation conditions and the conditions for the placing together of the cyclodextrin, of the polymers whose mutual compatibility is to be improved, as well as of possible adjuvants, access is thus afforded, as industrial products, to novel polymer mixtures having mechanical properties which are improved with regard to those obtained in the absence of any cyclodextrin.

Such improved polymer mixtures may be applied to the preparation of articles of any form (rings, tubes, films, granules, capsules or more elaborate forms such as packaging, including packaging of "blister-pack" type) and for any destination, by the use of any available thermoforming technique, and in particular by extrusion, co-extrusion, injection, blow-moulding or calendering, followed by any possible welding technique, including the application of high frequencies or ultrahigh frequencies or microwaves.

Moreover, it is noteworthy to point out that the present invention, whose general inventive concept results in the use of cyclodextrins in order to improve the mutual compatibility of polymers, makes it possible to obtain, under readily industrializable conditions, thermoformed, optionally welded articles based on polymers hitherto considered to be incompatible or poorly compatible, the said articles having properties, in particular mechanical properties, which are entirely in accordance with, or even superior to, the current requirements of the art.

Such particles may, in particular, result from the use of cyclodextrins for improving the mutual compatibility between, on the one hand, a natural polymer such as starch and, on the other hand, a synthetic polymer such as poly-epsilon-caprolactone or a polyethylene.

An even better understanding of the invention may be gained with the aid of the examples which follow and which are based on certain particularly advantageous modes of preparation and of application of the improved polymer mixture according to the invention.

EXAMPLE 1

Preparation of Compatibilizing Compositions Based on Cyclodextrin (BCD) and a Plasticized Starch Within the context of this example, compositions combining various levels of β-cyclodextrin (BCD) with a pre-plasticized starch are extruded and then granulated.

The extrusion is performed on a Rheomex TW 100 conical twin-screw extruder combined with a Rheocord 90 drive unit (Haake).

The sheath is conical and is 300 mm in length. The extruder is equipped with three heating zones along the sheath (zones 1, 2 and 3) and a head heating zone (zone 4) as well as mixed pressure and temperature sensors in zones 2, 3 and 4. The two screws (standard set of screws of reference 557-2211) are of interpenetrating and counter-rotatory type.

The round die used has a diameter of 4 mm.

The extruded and then granulated composition is composed of:

70% of amylose-rich corn starch of Eurylon® VII type supplied by the Applicant,

20% of Neosorb® P 60 sorbitol powder also supplied by the Applicant, and

10% of demineralized water.

To this composition are respectively added 0%, 4%, 10% and 14% by weight of β-cyclodextrin (BCD) marketed by the Applicant under the name Kleptose® B.

The conditions for extrusion of the compositions thus obtained are as follows:

set temperature
    zone 1: 95° C.,
    zone 2: 100° C.,
    zone 3: 103° C.,
    zone 4: 105° C.
screw speed: 100 rpm.

The extrudates obtained, in the form of moulded rods, are then granulated on a Lancelin brand granulator. The granules obtained are in the form of cylinders about 3 to 4 mm in height and about 4 mm in diameter.

It is observed overall that the presence of BCD in these compositions, and including its presence at high levels of incorporation (greater than or equal to 10% by weight), in no way jeopardizes their possibilities of extrusion and then of granulation.

EXAMPLE 2

Improvement of the Compatibility of a Polyethylene and a Starch

Granules of compositions resulting from Example 1 are, as will be described below, able to be used directly in the presence of a polymer which is incompatible with or poorly compatible with starch, such as a polyethylene, in order to prepare a polymer mixture with overall improved mechanical properties.

In the present case, the granules based, in particular, on BCD and starch obtained in Example 1 are mixed with variable amounts of low density polyethylene granules of Lactene® brand and reference 1 200 MN 18, supplied by the company ATO.

The composition of these polymer mixtures is given in Table 1 below. The control mixtures "T1", "T2" and "T3" are free of cyclodextrin.

These mixtures of granules are injected into the traction and impact sample mould of an injection press of Arburg 18 T "All Rounder" type.

The temperatures on the two heating bodies of the injection press are set at 110°–120° C. and the injection nozzle temperature is set at 120°–130° C. The injection pressure is 80 bar and the speed is 160 rpm.

The sample mould is kept at 20° C. for 45 seconds before opening.

The thermoformed articles obtained after injection of the polymer mixtures are standardized dumbbellshaped samples of Type 1 according to ISO recommendation R 527, the thickness of which samples is 4±0.5 mm.

These samples are then stored for 48 hours in an air-conditioned room at 20° C. and 65% relative humidity (RH).

The mechanical properties of each of the said polymer mixtures are evaluated on the samples thus obtained after injection and conditioning.

The evaluation tests are performed in traction using a dynamometer of "Instron 1122" type.

The main mechanical properties studied are:
the Young's modulus, expressed in MPa,
the breaking force, expressed in N,
the breaking strain, expressed in MPa, and
the deformation at break, expressed in %.

These properties are estimated on an average of 5 samples.

TABLE 1

| PRODUCT | NAME | % BY WEIGHT IN THE POLYMER MIXTURE | | | | | | | | | |
|---|---|---|---|---|---|---|---|---|---|---|---|
| LDPE | LACQTENE ® 1200 MN - 18 | 67.8 | 67.3 | 66.7 | 66.2 | 41.2 | 40 | 18.9 | 18.6 | 18.2 | 17.9 |
| STARCH | EURYLON ® VII | 22.6 | 22.4 | 22.2 | 22.1 | 41.2 | 40 | 56.8 | 55.8 | 54.6 | 53.7 |
| SORBITOL | NEOSORB ® P60 | 6.4 | 6.4 | 6.3 | 6.4 | 11.8 | 11.4 | 16.2 | 16.2 | 15.6 | 15.4 |
| WATER |  | 3.2 | 3.2 | 3.2 | 3.1 | 5.8 | 5.8 | 8.1 | 8.0 | 7.8 | 7.6 |
| β-CYCLODEXTRIN (BCD) | KLEPTOSE ® | — | 0.7 | 1.6 | 2.2 | — | 2.8 | — | 1.7 | 3.8 | 5.4 |
| REFERENCE OF THE MIXTURE |  | T1 | 1 | 2 | 3 | T2 | 4 | T3 | 5 | 6 | 7 |

Table 2 below gives the mechanical properties obtained for each polymer mixture.

TABLE 2

| REFERENCE OF THE MIXTURE | YOUNG's MODULUS (MPa) | BREAKING FORCE (N) | BREAKING STRAIN (MPa) | DEFORMATION AT BREAK (%) |
|---|---|---|---|---|
| T1 | 77 | 260 | 7 | 79 |
| 1 | 92 | 299 | 9 | 92 |
| 2 | 89 | 294 | 8 | 91 |
| 3 | 91 | 299 | 8 | 88 |
| T2 | 83 | 152 | 4.5 | 24 |
| 4 | 104 | 249 | 7 | 47 |
| T3 | 67 | 118 | 3 | 17 |
| 5 | 83 | 172 | 5 | 30 |
| 6 | 80 | 191 | 5 | 34 |
| 7 | 84 | 185 | 5 | 38 |

These results show overall that the introduction of cyclodextrin, in this instance BCD, into various polymer mixtures combining starch and polyethylene makes it possible to improve the mechanical properties of the said mixtures, in particular the breaking force, the breaking strain and the deformation at break observed in thermoformed articles, in this instance injected articles, obtained from such mixtures.

Moreover, it is appreciable to note that such an improvement in the said mechanical properties is significant even with the use of low levels of cyclodextrin. By way of examples, levels of introduction from about 0.7 to 2.8%, expressed by weight relative to the weight of the resulting polymer mixture, thus prove to be effective amounts in the sense of the present invention.

EXAMPLE 3

Improvement in the Compatibility of a Starch and Polycaprolactone

In this example, granules obtained, according to the conditions described in Example 1, from the following compositions are used:

1) a composition based on 70% Eurylon® VII+20% Neosorb® P60+10% water. This starchy "control" composition is free of any cyclodextrin, 2) a composition combining the said "control composition" with 10% by weight of BCD Kleptose®. This starchy composition may be used, as described below, in the context of the process for the preparation of the polymer mixture according to the invention.

The said granules are then mixed with polycaprolactone (PCL) granules of reference "CAPA 650®" marketed by the company Solvay Interox. The weight ratio of granules of starchy composition to PCL granules is 9/1.

The polymer mixtures thus obtained are then injected, conditioned and then tested under the same conditions as those described in Example 2.

The results obtained are collated in Table 3 below.

TABLE 3

| BASE OF THE POLYMER MIXTURE | YOUNG's MODULUS (MPa) | BREAK- ING FORCE (N) | BREAK- ING STRAIN (MPa) | DEFORMA- TION AT BREAK (%) |
|---|---|---|---|---|
| PLASTICIZED EURYLON ® + CAPA 650 ® + BCD KLEPTOSE ® | 110 | 246 | 9 | 39 |
| IDENTICAL BUT CONTAINING NO CLYCLODEXTRIN (CONTROL) | 106 | 176 | 5 | 16 |

It emerges clearly from Table 3 that a cyclodextrin makes it possible to improve the compatibility of a starch and a synthetic polyester such as polycaprolactone, the latter moreover having a chemical nature which is quite different from that of a polyethylene.

The mechanical properties of the starch/PCL polymer mixture are significantly improved by means of the use of a cyclodextrin such as BCD Kleptose®.

This marked improvement is reflected as much in terms of breaking force and breaking strain as of deformation at break, as evaluated in the injected articles (samples) obtained.

EXAMPLE 4

Improvement in the Compatibility of a Wheat Starch and a Low Density Polyethylene The following are respectively extruded and then granulated under the conditions described in Example 1:

a starchy "control" composition containing 70% of native wheat starch+20% of Neosorb® P60 sorbitol powder+10% of demineralized water, a composition combining the said starchy "control" composition with 5% by weight of BCD Kleptose®.

This composition may be used, as described below, in the context of the process according to the invention.

The granules thus obtained are then mixed with granules of a low density polyethylene (LDPE) of Lacqtene® brand, of reference 1 200 MN 18 and supplied by ATO.

The composition of these "control" granules and granules "according to the invention" is given in Table 4 below.

TABLE 4

| | | POLYMER MIXTURE | |
|---|---|---|---|
| PRODUCT | REFERENCE | CONTROL | ACCORDING TO THE INVENTION |
| LDPE | LACQTENE ® 1 200 MN 18 | 41.2 | 40 |
| NATIVE WHEAT STARCH | | 41.2 | 40 |
| SORBITOL | NEOSORB ® P60 | 11.8 | 11.4 |
| WATER | | 5.8 | 5.7 |
| β-CYCLO- DEXTRIN | KLEPTOSE ® | — | 2.9 |

These polymer mixtures are subsequently injected, conditioned and then tested under the same conditions as those described in Example 2.

The results obtained are collated in Table 5 below.

TABLE 5

| BASE OF THE POLYMER MIXTURE | YOUNG's MODULUS (MPa) | BREAK- ING FORCE (N) | BREAK- ING STRAIN (MPa) | DEFORMA- TION AT BREAK (%) |
|---|---|---|---|---|
| NATIVE WHEAT + LDPE + BCD KLEPTOSE ® | 37 | 197 | 5 | 109 |
| IDENTICAL BUT CONTAINING NO CYCLODEXTRIN (CONTROL) | 38 | 155 | 4 | 96 |

A significant improvement in the mechanical properties of the polymer mixture by means of the introduction of cyclodextrin is again observed, in accordance with the invention, for a new pair of polymers (wheat starch/LDPE).

This improvement is appreciable even with the introduction of a low level of cyclodextrin, in this instance less than 3% by weight of BCD.

EXAMPLE 5

Improvement in the Compatibility of a Waxy Corn Starch and a Low Density Polyethylene The following are respectively extruded and then granulated under the conditions described in Example 1:

a starchy "control" composition containing 70% of waxy corn starch (product Waxilys® 200 marketed by the Applicant)+20% of Neosorb® P60+10% of water, a composition combining the said starchy "control" composition with 5% by weight of BCD Kleptose®.

This composition may be used, as described below, in the context of the process according to the invention.

The granules thus obtained are then mixed with LDPE granules of reference "Lacqtene® 1 200 MN 18".

The composition of these "control" granules and granules "according to the invention" is given in Table 6.

TABLE 6

| | | POLYMER MIXTURE | |
|---|---|---|---|
| PRODUCT | REFERENCE | CONTROL | ACCORDING TO THE INVENTION |
| LDPE | LACQTENE ® 1 200 MN 18 | 41.2 | 40 |
| STARCH | WAXILYS ® 200 | 41.2 | 40 |
| SORBITOL | NEOSORB ® P60 | 11.8 | 11.4 |
| WATER | | 5.8 | 5.7 |
| β-CYCLO-DEXTRIN | KLEPTOSE ® | — | 2.9 |

These polymer mixtures are subsequently injected, conditioned and then tested under the same conditions as those described in Example 2.

The results obtained are collated in Table 7 below.

TABLE 7

| BASE OF THE POLYMER MIXTURE | YOUNG's MODULUS (MPa) | BREAKING FORCE (N) | BREAKING STRAIN (MPa) | DEFORMATION AT BREAK (%) |
|---|---|---|---|---|
| WAXY STARCH + LDPE + BCD KLEPTOSE ® | 71 | 238 | 6 | 58 |
| IDENTICAL BUT CONTAINING NO CYCLODEXTRIN (CONTROL) | 65.5 | 178 | 4.5 | 27 |

A significant increase in mechanical properties of the polymer mixture by means of the incorporation of cyclodextrin is again observed, in accordance with the invention, for a new pair of polymers (waxy corn starch/LDPE).

Moreover, it should be pointed out that the very wide applicability of cyclodextrins as agents which improve the mutual compatibility of polymers has been verified by the Applicant, who also observed a marked improvement in the mechanical properties of the Waxilys® 200/Lacqtene® 1 200 MN 18 mixture by replacing the combination of 20% Neosorb® P60+10% water, used to produce the granules according to the invention, by, respectively:

20% Maltisorb® P 200 maltitol powder+10% water,

10% Neosorb® P60+10% Maltisorb® P 200 maltitol powder+10% water,

15% Neosorb® P60+5% Xylisorb® 300 xylitol powder+ 10% water,

30% Polysorb® 70/12/12 hydrogenated starch hydrolysate,

30% Maltisorb® 75/75 hydrogenated starch hydrolysate,

15% glycerol+15% water,

15% Lacty® crystallized lactitol from C.C.A. Biochem+ 15% water,

10% crystallized erythritol+20% water.

In all cases, a breaking force, a breaking strain and a deformation at break which are significantly superior to the values indicated in Table 7 for the control polymer mixture are obtained for the resulting injectates.

EXAMPLE 6

Improvement in the Compatibility of an Amylose-Rich Starch and Polycaprolactone Various granulated polymer mixtures based, in particular, on starch (Eurylon® VII) and polycaprolactone (PCL of "CAPA 650®" type) and whose composition is given in Table 8 below are subjected to an injection treatment as described in Example 2.

TABLE 8

| | | POLYMER MIXTURE | | |
|---|---|---|---|---|
| PRODUCT | REFERENCE | CONTROL | CONTROL | ACCORDING TO THE INVENTION |
| POLYCAPROLACTONE | CAPA 650 ® | 41.2 | 41.1 | 41.1 |
| STARCH | EURYLON ® VII | 41.2 | 38 | 38 |
| SORBITOL | NEOSORB ® P60 | 11.7 | 10.8 | 10.8 |
| WATER | | 5.9 | 5.4 | 5.4 |
| β-CYCLODEXTRIN | KLEPTOSE ® | — | — | 4.7 |
| ETHYLENIC COPOLYMER | LOTADER ® 3210 | — | 4.7 | — |

As described above, the mechanical properties obtained using BCD Kleptose® are evaluated with regard to those observed respectively:

in the absence of any cyclodextrin, and using, as compatibilizing agent, the same amount (4.7%) of an ethylenic copolymer of Lotader® 3210 type.

The results are given in Table 9 below.

TABLE 9

| BASE OF THE POLYMER MIXTURE | YOUNG's MODULUS (MPa) | BREAKING FORCE (N) | BREAKING STRAIN (MPa) | DEFORMATION AT BREAK (%) |
|---|---|---|---|---|
| EURYLON ® + CAPA 650 ® + BCD KLEPTOSE ® | 198.3 | 416 | 10.6 | 44.5 |
| IDENTICAL BUT CONTAINING NO CYCLODEXTRIN (CONTROL) | 160.4 | 377.9 | 9.7 | 26.8 |
| IDENTICAL BUT WITH LOTADER ® AND CONTAINING NO CYCLODEXTRIN (CONTROL) | 146.9 | 377.4 | 9.6 | 34.4 |

It is observed that the compatibilizing agent according to the prior art is practically ineffective here whereas the BCD significantly improves the mechanical properties of the polymer mixture based on starch+PCL, including when these two polymers are, as in the present case, introduced in virtually equivalent amounts (equal to about 40% by weight) into the said mixture.

EXAMPLE 7

Improvement in the Compatibility of an Amylose-Rich Starch and Low Density Polyethylene Various granulated polymer mixtures based, in particular, on starch (Eurylon® VII) and polyethylene (LDPE of "Lacqtene® 1 200 MN 18" type) and whose composition is given in Table 10 below are subjected to an injection treatment as described in Example 2.

with regard to those observed in the absence of any cyclodextrin or in the presence of the same amount (2.8%) of a starch hydrolysate of Glucidex® 47 type marketed by the Applicant.

The results are given in Table 11 below.

TABLE 11

| BASE OF THE POLYMER MIXTURE | YOUNG's MODULUS (MPa) | BREAKING FORCE (N) | BREAKING STRAIN (MPa) | DEFORMATION BREAK (%) |
|---|---|---|---|---|
| EURYLON ® + LDPE + BCD KLEPTOSE ® | 104.4 | 248.7 | 7.2 | 47.2 |
| EURYLON ® + LDPE + α-CYCLODEXTRIN | 76.9 | 254.4 | 6.5 | 58.4 |
| IDENTICAL BUT CONTAINING NO CYCLODEXTRIN (CONTROL) | 82.8 | 151.9 | 4.5 | 24.1 |
| IDENTICAL BUT WITH GLUCIDEX ® 47 AND CONTAINING NO CYCLODEXTRIN (CONTROL) | 60.6 | 188.7 | 4.8 | 33.9 |

It is observed that in a polymer mixture based on virtually equivalent amounts (equal to about 40% by weight) of starch and LDPE, the use of a cyclodextrin also makes it possible to improve the mechanical properties of the said mixture significantly.

Moreover, it is appreciable to note that not only a β-cyclodextrin but also an α-cyclodextrin may constitute particularly effective compatibilizing agents. These products are of significantly higher performance than a starch derivative of Glucidex® 47 type.

TABLE 10

| | | POLYMER MIXTURE | | | |
|---|---|---|---|---|---|
| PRODUCT | REFERENCE | CONTROL | CONTROL | ACCORDING TO THE INVENTION | ACCORDING TO THE INVENTION |
| LDPE 1200 MN 18 | LACQTENE ® | 41.2 | 39.3 | 40 | 39.3 |
| STARCH VII | EURYLON ® | 41.2 | 41.1 | 40 | 41.1 |
| SORBITOL P60 | NEOSORB ® | 11.8 | 11.2 | 11.4 | 11.2 |
| WATER | | 5.8 | 5.6 | 5.8 | 5.6 |
| STARCH DERIVATIVE | GLUCIDEX ® 47 | — | 2.8 | — | — |
| β-CYCLO-DEXTRIN | KLEPTOSE ® | — | — | 2.8 | — |
| α-CYCLO-DEXTRIN | — | — | — | — | 2.8 |

As described above, the mechanical properties obtained are evaluated using, respectively:

BCD Kleptose®,

α-cyclodextrin,

I claim:

1. A process for improving mutual compatibility of polymers, said process comprising including an effective amount of cyclodextrin in a mixture of polymers to form a resultant mixture.

2. The process according to claim 1, wherein the amount of cyclodextrin comprises from about 0.5% to about 20% by weight of the resultant mixture comprising the polymers and the cyclodextrin.

3. The process according to claim 1, wherein the amount of cyclodextrin comprises from about 1% to about 10% by weight of the resultant mixture.

4. The process according to claim 1, wherein at least one of the said polymers comprises a polymer of natural origin selected from the group consisting of starches, polyfructans, celluloses, and hemicelluloses; plant proteins; polymers of an acid selected from the group of acids consisting of lactic acid, glycolic acid, hydroxybutyric acid, hydroxypropionic acid and hydroxyvaleric acid; and copolymers of an acid selected from the group of acids consisting of lactic acid, glycolic acid, hydroxybutyric acid, hydroxypropionic acid and hydroxyvaleric acid.

5. The process according to claim 1, wherein at least one of the said polymers comprises a polymer of synthetic origin selected from the group consisting of polyolefins, polystyrenes, vinylic copolymers, and synthetic polyesters.

6. The process according to claim 1, wherein the resultant mixture comprises and at least one additional constituent selected from the group consisting of polymers, plasticizers, nucleation agents and compatibilizing agents.

7. The process according to claim 6, wherein said nucleation agents consist essentially of alditol acetals.

8. The process according to claim 6, wherein said compatabilizing agents consist essentially of ethylenic copolymers.

9. The process according to claim 1, wherein the resultant mixture comprises a starch wherein a weight ratio of cyclodextrin to starch is between about 1/1 and about 1/100.

10. The process according to claim 1, wherein the resultant mixture comprises said cyclodextrin and a starch wherein a weight ratio of said cyclodextrin to said starch is between about 1/2 and about 1/50.

11. The process according to claim 1, wherein the resultant mixture comprises said cyclodextrin and a starch wherein a weight ratio of cyclodextrin to starch is between about 1/5 and about 1/50.

12. The process according to claim 1, wherein the resultant mixture comprises a composition comprising cyclodextrin and at least one plasticizer wherein a weight ratio between cyclodextrin and plasticizer being is about 2/1 and about 1/50.

13. The process according to claim 12, wherein said plasticizer comprises a polyol.

14. The process according to claim 1, wherein the resultant mixture comprises said cyclodextrin and at least one plasticizer wherein a weight ratio between said cyclodextrin and said plasticizer is between about 2/1 and about 1/10.

15. The process according to claim 14, wherein said plasticizer comprises at least one polyol.

16. The process according to claim 1, wherein the resultant mixture comprises a composition comprising said cyclodextrin and at least one plasticizer wherein a weight ratio between cyclodextrin and plasticizer is between about 1/1 and about 1/10.

17. The process according to claim 16, wherein said plasticizer comprises at least one polyol.

18. The process according to claim 1, wherein one of the at least one of said polymers is a starch, and another of the at least one of said polymers is a polymer of synthetic origin, wherein a weight ratio between the starch and the polymer of synthetic origin in the resultant mixture is between about 1/20 and about 20/1.

19. The process according to claim 1, wherein one of the at least one of said polymers is a starch, and another of the at least one of said polymers is a polymer of synthetic origin, wherein a weight ratio between the starch and the polymer of synthetic origin in the resultant mixture is between about 1/10 and about 10/1.

20. The process according to claim 1, wherein one of the at least one of said polymers is a starch, and another of the at least one of said polymers is a polymer of synthetic origin selected from the group consisting of a polyethylene, a polypropylene, a polystyrene, a polyvinyl alcohol, a polyvinyl chloride, and a poly(epsilon-caprolactone), and wherein a weight ratio between the starch and the polymer of synthetic origin is between about 1/20 and about 20/1.

21. The process according to claim 1, wherein one of the at least one of said polymers is a starch, and another of the at least one of said polymers is a polymer of synthetic origin selected from the group consisting of a polyethylene, a polypropylene, a polystyrene, a polyvinyl alcohol, a polyvinyl chloride, and a poly(epsilon-caprolactone), and wherein a weight ratio between the starch and the polymer of synthetic origin is between about 1/10 and about 10/1.

22. A composition comprising starch, plasticizer and cyclodextrin, wherein a weight ratio between the cyclodextrin and the starch is between about 1/2 and about 1/50, and wherein the weight ratio between the cyclodextrin and the plasticizer is between about 1/1 and about 1/10.

23. The composition according to claim 22, wherein said composition comprises a form selected from the group consisting of powder and granules.

* * * * *